Patented Jan. 3, 1933

1,893,284

UNITED STATES PATENT OFFICE

EMMET F. HITCH AND MILES A. DAHLEN, OF WILMINGTON, DELAWARE, ASSIGNORS TO E. I. DU PONT DE NEMOURS & COMPANY, OF WILMINGTON, DELAWARE, A CORPORATION OF DELAWARE

CELLULOSE DERIVATIVE COMPOSITION

No Drawing. Application filed November 28, 1931. Serial No. 577,865.

This invention relates to cellulose derivative compositions containing an alkyl ether of ortho- or para-cyclohexyl-phenol and, more particularly, to coating and plastic compositions comprising cellulose nitrate and an alkyl ether of ortho- or para-cyclohexylphenol.

Heretofore many substances have been used as plasticizers for cellulose derivatives to impart to the resulting compositions such properties as non-inflammability, flexibility, and the like.

An object of the present invention is to provide a cellulose derivative composition, particularly a cellulose nitrate composition, including a plasticizer having good solvent power for the cellulose derivative, exceedingly low volatility at room temperature, good stability, and miscibility or solubility in the usual solvents or solvent mixtures employed for dissolving cellulose derivatives. Another object is to provide a cellulose derivative composition which will give films that retain their flexibility substantially indefinitely.

The above objects are accomplished according to the present invention by employing in cellulose derivative compositions, as a plasticizer, an alkyl ether of ortho- or para-cyclohexyl-phenol, or a mixture of the two, in conjunction with the usual solvents, diluents, fillers, resins, and/or pigments commonly used in cellulose derivatives coating and plastic compositions.

It has been found that these alkyl ethers of ortho- or para-cyclohexyl-phenol as a class are suitable for use as plasticizers for cellulose derivative compositions, although the alkyl ethers of ortho- or para-cyclohexylphenol in which the alkyl group contains from 1-10 carbon atoms, inclusive, are preferred, that is, alkyl ethers of cyclohexylphenol of the general graphic formula

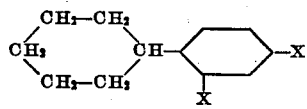

in which one X represents a hydrogen atom and the other X represents an alkoxy group containing from 1-10 carbon atoms, inclusive. Still more specifically, the derivatives in which the alkoxy group contains from 1-4 carbon atoms, inclusive, have been found most suitable.

The alkyl ethers of ortho-cyclohexylphenol in general show materially lower melting points than the corresponding para-compounds and are, therefore, more readily used in greater quantity in cellulose derivative compositions than the corresponding para-derivatives. Furthermore, various individual compounds of the class show more favorable properties than others, for example, the ethyl ether of para-cyclohexylphenol shows a higher boiling point and lower melting point than the corresponding methyl ether and is, therefore, somewhat more desirable for use as a plasticizer. It has also been found that a mixture of the ethers of ortho- and para-cyclohexyl-phenol in many instances show properties equal to, or even superior to, either of the compounds alone. For example, a mixture of 10 parts of the methyl ether of para-cyclohexyl-phenol with 90 parts of the methyl ether of ortho-cyclohexyl-phenol exhibits a lower melting point than either of its components.

These alkyl ethers of ortho- and para-cyclohexyl-phenol may be conveniently prepared by converting ortho- or para-cyclohexyl-phenol to the desired ether by the application of the methods commonly used in converting phenol, cresol, and similar compounds to their analogous derivatives. The following examples are given to show methods of preparing the alkyl ethers of ortho- and para-cyclohexyl-phenol, although this invention is not primarily concerned with the preparation of these compounds.

*Example 1.*—Ortho-cyclohexyl-phenol is dissolved in water by the addition of a molar equivalent of sodium hydroxide and this solution is treated with a molar equivalent of dimethyl sulphate at a temperature of 60–100° C. The methyl ether of ortho-cyclohexyl-phenol is deposited as an oil and is separated, washed with strong alkali to remove any unchanged ortho-cyclohexyl-phenol and to destroy unreacted dimethyl sulphate, dried and purified by distillation, preferably under diminished pressure. The product is a colorless liquid boiling at about 120° C. under approximately 5 mm. pressure.

*Example 2.*—The ethyl ether of para-cyclohexyl-phenol may be prepared similarly to the preparation of the methyl ether of ortho-cyclohexyl-phenol given in Example 1 by the use of diethyl sulphate as the alkylating agent and the substitution of para-cyclohexyl-phenol for the ortho- compound. The ethyl ether of para-cyclohexyl-phenol is a colorless solid melting at about 30° C. and boiling at about 139° C. under approximately 5 mm. pressure.

*Example 3.*—Ortho-cyclohexyl-phenol is dissolved in normal butyl alcohol and a molar equivalent of metallic sodium is added, forming a solution of the sodium salt of the phenol. The solution is then boiled under reflux for several hours with a molar equivalent of normal butyl chloride. The solution is filtered from deposited sodium chloride, washed with aqueous sodium hydroxide to remove unalkylated ortho-cyclohexyl-phenol, dried, and then subjected to fractional distillation, preferably under reduced pressure. The normal butyl ether of ortho-cyclohexyl-phenol is a colorless liquid boiling at about 155° C. under approximately 8 mm. pressure.

Among the most suitable compounds of the general class of alkyl ethers of ortho- and para-cyclohexyl-phenol for use as plasticizers for cellulose derivatives are the following:

Methyl ether of ortho-cyclohexyl-phenol.
Ethyl ether of ortho-cyclohexyl-phenol.
N-Propyl ether of ortho-cyclohexyl-phenol.
Isopropyl ether of ortho-cyclohexyl-phenol.
N-Butyl ether of ortho-cyclohexyl-phenol.
Isohexyl ether of ortho-cyclohexyl-phenol.
Methyl ether of para-cyclohexyl-phenol.
Ethyl ether of para-cyclohexyl-phenol.
Isopropyl ether of para-cyclohexyl-phenol.
N-Propyl ether of para-cyclohexyl-phenol.
N-Butyl ether of para-cyclohexyl-phenol.
Decyl ether of para-cyclohexyl-phenol.

Particularly suitable mixtures of alkyl ethers of ortho- and para-cyclohexyl-phenol are the following:

Methyl-ether of ortho-cyclohexyl-phenol plus Methyl ether of para-cyclohexyl-phenol,
Ethyl ether of ortho-cyclohexyl-phenol plus Ethyl ether of para-cyclohexyl-phenol,
N-Butyl ether of ortho-cyclohexyl-phenol plus N-Butyl ether of para-cyclohexyl phenol.

These alkyl ethers may be used as plasticizers for cellulose esters of cellulose ethers. They are particularly suitable for use with cellulose nitrate, inasmuch as they have excellent solvent power for that particular cellulose ester, but they may also be used with cellulose acetate, despite the fact that their solvent power for the acetate is considerably less than their solvent power for the nitrate. They also possess excellent solvent power for the cellulose ethers, such as ethyl cellulose and benzyl cellulose.

In preparing cellulose derivative compositions using these compounds as plasticizers, the methods commonly used in the art are suitable. The well known solvents and diluents for cellulose derivatives, such as ethyl acetate, butyl acetate, methanol, ethyl alcohol, ethylene glycol, toluene, acetone, and the like, may be employed as the alkyl ethers of the ortho- and para-cyclohexyl-phenols are either soluble or miscible in these diluents. Likewise the common ingredients employed in cellulose derivative compositions for special purposes may be added, such as other plasticizers, resins both natural and artificial, gums, pigments, fillers, et cetera. As will be understood by those skilled in the art, the proportion of plasticizer to cellulose derivatives may be varied widely, as well as the proportions of the various other ingredients to be included in the composition, depending upon the properties desired in the final product.

The compositions according to the present invention are suitable for use in the preparation of artificial leather, celluloid, lacquers, photographic film, and various plastics, as well as for all uses to which cellulose derivative compositions of this type are normally put. The resulting products are stable and retain their flexibility, which may be regulated, to a large degree, by the amount of plasticizer added, practically indefinitely. These compositions do not show any tendency to discolor due to decomposition of the alkyl ethers of the ortho- and para-cyclohexyl-phenols which are very stable in combination with cellulose derivatives. In the case of plastic compositions, stabilizers, such as urea, may be employed, as well as the other ingredients herein mentioned.

As many apparently widely different embodiments of this invention may be made without departing from the spirit and scope thereof, it is to be understood that the invention is not limited to the specific embodiments thereof except as defined in the appended claims.

We claim:

1. A composition comprising a cellulose derivative and, as a plasticizer therefor, a compound from the group consisting of the alkyl ethers of ortho- and para-cyclohexyl-phenol.

2. A composition comprising a cellulose derivative and, as a plasticizer therefor, a compound from the group consisting of the alkyl ethers of ortho- and para-cyclohexyl-phenol in which the alkyl group contains from 1–10 carbon atoms, inclusive.

3. A composition comprising a cellulose derivative and, as a plasticizer therefor, a compound from the group consisting of the alkyl ethers of ortho- and para-cyclohexyl-phenol in which the alkyl group contains from 1–4 carbon atoms, inclusive.

4. A composition comprising a cellulose derivative and, as a plasticizer therefor, an alkyl ether of cyclohexyl-phenol of the formula

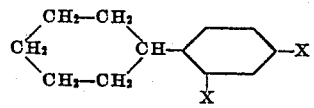

in which one X represents a hydrogen atom and the other X represents an alkoxy group containing from 1–10 carbon atoms, inclusive.

5. A composition comprising a cellulose derivative and, as a plasticizer therefor, an alkyl ether of cyclohexyl-phenol of the formula

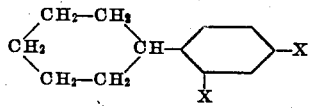

in which one X represent a hydrogen atom and the other X represents an alkoxy group containing from 1–4 carbon atoms, inclusive.

6. A composition comprising a cellulose derivative and, as a plasticizer therefor, a mixture comprising an alkyl either of ortho-cyclohexyl-phenol and an alkyl ether of para-cyclohexyl-phenol.

7. A composition comprising a cellulose derivative and, as a plasticizer therefor, a mixture comprising an alkyl ether of ortho-cyclohexyl-phenol and an alkyl ether of para-cyclohexyl-phenol, in which ethers the alkyl group contains from 1–4 carbon atoms, inclusive.

8. A composition comprising cellulose nitrate and, as a plasticizer therefor, a compound from the group consisting of the alkyl ethers of ortho- and para-cyclohexyl-phenol.

9. A composition comprising cellulose nitrate and, as a plasticizer therefor, a compound from the group consisting of the alkyl ethers of ortho- and para-cyclohexyl-phenol in which the alkyl group contains from 1–10 carbon atoms, inclusive.

10. A composition comprising cellulose nitrate and, as a plasticizer therefor, a compound from the group consisting of the alkyl ethers of ortho- and para-cyclohexyl-phenol in which the alkyl group contains from 1–4 carbon atoms, inclusive.

11. A composition comprising cellulose nitrate and, as a plasticizer therefor, an alkyl ether of cyclohexyl-phenol of the formula

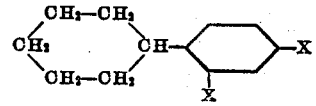

in which one X represents a hydrogen atom and the other X represents an alkoxy group containing from 1–10 carbon atoms, inclusive.

12. A composition comprising cellulose nitrate and, as a plasticizer therefor, an alkyl ether of cyclohexyl-phenol of the formula

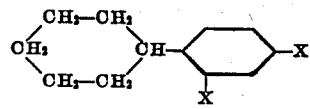

in which one X represents a hydrogen atom and the other X represents an alkoxy group containing from 1–4 carbon atoms, inclusive.

13. A composition comprising cellulose nitrate and, as a plasticizer therefor, a mixture comprising an alkyl ether of ortho-cyclohexyl-phenol and an alkyl ether of para-cyclohexyl-phenol.

14. A composition comprising cellulose nitrate and, as a plasticizer therefor, a mixture comprising an alkyl ether of ortho-cyclohexyl-phenol and an alkyl ether of para-cyclohexyl-phenol, in which ethers the alkyl group contains from 1–4 carbon atoms, inclusive.

In testimony whereof we affix our signatures.

EMMET F. HITCH.
MILES A. DAHLEN.

CERTIFICATE OF CORRECTION.

Patent No. 1,893,284.      January 3, 1933.

EMMET F. HITCH, ET AL.

It is hereby certified that error appears in the printed specification of the above numbered patent requiring correction as follows: Page 3, line 39, claim 6, for "either" read "ether"; and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.